United States Patent
Patel

(10) Patent No.: US 10,082,992 B2
(45) Date of Patent: Sep. 25, 2018

(54) PROVIDING A PRINT-READY DOCUMENT

(71) Applicant: Hewlett-Packard Development Company, L.P., Houston, TX (US)

(72) Inventor: Arjun Angur Patel, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 15/521,870

(22) PCT Filed: Dec. 22, 2014

(86) PCT No.: PCT/US2014/071829
§ 371 (c)(1),
(2) Date: Apr. 25, 2017

(87) PCT Pub. No.: WO2016/105334
PCT Pub. Date: Jun. 30, 2016

(65) Prior Publication Data
US 2017/0315764 A1    Nov. 2, 2017

(51) Int. Cl.
*G06F 3/12* (2006.01)

(52) U.S. Cl.
CPC .......... *G06F 3/1247* (2013.01); *G06F 3/1208* (2013.01); *G06F 3/1256* (2013.01); *G06F 3/1285* (2013.01)

(58) Field of Classification Search
CPC .. G06K 15/00; G06K 15/007; G06K 15/1859; G06F 3/1287; G06F 17/21;
(Continued)

(56) References Cited

U.S. PATENT DOCUMENTS 6,029,182 A    2/2000 Nehab et al.
6,975,419 B2   12/2005 Staas et al.
(Continued)

FOREIGN PATENT DOCUMENTS

CN    101329687 A    12/2008
CN    102073728 A    5/2011
(Continued)

OTHER PUBLICATIONS

Chen, Y. et al, "Improve on Frequent Access Path Algorithm in Web Page Personalized Recommendation Model," (Research Paper), ICIST, Mar. 2011, 4 pages.
(Continued)

*Primary Examiner* — Negussie Worku
(74) *Attorney, Agent, or Firm* — HP Inc. Patent Department

(57) ABSTRACT

Example embodiments relate to providing print ready documents. In some implementations, a computing device: receives, from a client device, a request for a print-ready document, the request specifying an electronic document for which the print-ready document is to be provided; selects a particular extraction module from a plurality of extraction modules for the electronic document, the selection being based on prior user feedback received from a plurality of client devices, the prior user feedback indicating a measure of quality of print-ready documents created for the electronic document using content extracted from the web page by the particular extraction module; and provides data specifying the particular extraction module to a print service that causes presentation of the print-ready document at the client device, the print-ready document including content extracted from the electronic document by the particular extraction module.

14 Claims, 5 Drawing Sheets

(58) Field of Classification Search
CPC .............. G06F 2216/17; G06F 3/1265; H04N 1/00132; H04N 1/00145; H04N 1/00164; H04N 1/00188; H04N 1/00204; H04N 1/0023; H04N 1/00244
USPC .... 358/1.15, 1.1, 1.18, 402, 403, 1.11, 1.12, 358/1.14, 1.16, 1.17; 709/203, 217, 226, 709/205, 206, 213, 214, 225, 227, 230, 709/246
See application file for complete search history.

(56) References Cited

U.S. PATENT DOCUMENTS

| | | |
|---|---|---|
| 7,065,497 B1 | 6/2006 | Brewster et al. |
| 7,225,401 B2 | 5/2007 | Purvis |
| 7,249,319 B1 | 7/2007 | Payne et al. |
| 7,290,285 B2 | 10/2007 | McCurdy et al. |
| 7,302,423 B2 | 11/2007 | De Bellis |
| 7,386,791 B2 | 6/2008 | Jacobson |
| 7,565,350 B2 | 7/2009 | Fetterly et al. |
| 7,617,446 B2 | 11/2009 | Dutta |
| 7,711,747 B2 | 5/2010 | Renders et al. |
| 7,720,835 B2 | 5/2010 | Ward et al. |
| 7,769,751 B1 | 8/2010 | Wu et al. |
| 7,861,165 B2 | 12/2010 | Stevenson |
| 7,996,000 B1 | 8/2011 | Dubinko et al. |
| 8,020,090 B2 | 9/2011 | Chen et al. |
| 8,046,681 B2 | 10/2011 | Vydiswaran et al. |
| 8,279,471 B2* | 10/2012 | Ferlitsch ............... G06F 13/102 348/207.2 |
| 8,479,092 B1 | 7/2013 | Pandey |
| 8,593,666 B2 | 11/2013 | Xiao |
| 8,645,369 B2 | 2/2014 | Poblete et al. |
| 8,683,379 B2 | 3/2014 | LuVogt et al. |
| 8,713,438 B1 | 4/2014 | Broniek et al. |
| 8,745,091 B2 | 6/2014 | McHenry et al. |
| 9,692,739 B1* | 6/2017 | Harrison, Jr. ........... H04L 63/08 |
| 9,910,494 B2* | 3/2018 | Westerman ............ G06F 3/016 |
| 9,977,500 B2* | 5/2018 | Westerman ............ G06F 3/016 |
| 2002/0078045 A1 | 6/2002 | Dutta |
| 2002/0123988 A1 | 9/2002 | Dean et al. |
| 2003/0086098 A1* | 5/2003 | Sesek .................... G06F 3/1285 358/1.1 |
| 2003/0086117 A1* | 5/2003 | Lester .................... G06K 15/00 358/1.15 |
| 2003/0142801 A1 | 7/2003 | Pecht |
| 2003/0172162 A1* | 9/2003 | Twede ................... G06F 9/4843 709/226 |
| 2003/0210424 A1 | 11/2003 | Sandfort et al. |
| 2004/0185882 A1 | 9/2004 | Gecht et al. |
| 2004/0249934 A1 | 12/2004 | Anderson et al. |
| 2004/0252332 A1 | 12/2004 | McCoog et al. |
| 2005/0010587 A1* | 1/2005 | Matsubayashi ....... G06F 3/1206 |
| 2005/0120311 A1 | 6/2005 | Thrall |
| 2005/0134893 A1* | 6/2005 | Han ...................... G06F 3/121 358/1.14 |
| 2005/0138065 A1 | 6/2005 | Ciriza |
| 2005/0154718 A1 | 7/2005 | Payne et al. |
| 2005/0251399 A1* | 11/2005 | Agarwal ............ G06F 17/30867 705/1.1 |
| 2006/0033950 A1 | 2/2006 | Nakamura |
| 2006/0048053 A1 | 3/2006 | Sembower et al. |
| 2006/0123114 A1 | 6/2006 | Aoki et al. |
| 2006/0125820 A1 | 6/2006 | Turcan et al. |
| 2006/0143286 A1 | 6/2006 | Aoki et al. |
| 2006/0167862 A1 | 7/2006 | Reisman |
| 2006/0173985 A1 | 8/2006 | Moore |
| 2006/0277482 A1 | 12/2006 | Hoffman et al. |
| 2007/0027932 A1 | 2/2007 | Thibeault |
| 2007/0047844 A1 | 3/2007 | Watanabe et al. |
| 2007/0130509 A1 | 6/2007 | Gombert et al. |
| 2007/0174298 A1 | 7/2007 | Tanimoto |
| 2007/0220411 A1 | 9/2007 | Hauser |
| 2007/0247664 A1 | 10/2007 | Yamamoto |
| 2008/0005250 A1 | 1/2008 | Oksum |
| 2008/0005651 A1 | 1/2008 | Grefenstette et al. |
| 2008/0030775 A1 | 2/2008 | Adachi et al. |
| 2008/0046459 A1 | 2/2008 | Hinohara |
| 2008/0068650 A1 | 3/2008 | Negoro |
| 2008/0089709 A1 | 4/2008 | Higashi |
| 2008/0097828 A1 | 4/2008 | Silverbrook et al. |
| 2008/0133560 A1* | 6/2008 | Ferlitsch ............ H04N 1/00344 |
| 2008/0147514 A1 | 6/2008 | Shuster et al. |
| 2008/0307308 A1 | 12/2008 | Sullivan et al. |
| 2009/0002770 A1 | 1/2009 | Cavill et al. |
| 2009/0013071 A1 | 1/2009 | Matoba et al. |
| 2009/0030889 A1 | 1/2009 | Chatow et al. |
| 2009/0119260 A1 | 5/2009 | Chopra et al. |
| 2009/0171751 A1 | 7/2009 | Zhou et al. |
| 2009/0310168 A1 | 12/2009 | Kunioka et al. |
| 2009/0316198 A1 | 12/2009 | Takeuchi et al. |
| 2010/0030768 A1 | 2/2010 | Poblete et al. |
| 2010/0058204 A1 | 3/2010 | Wilson |
| 2010/0069116 A1 | 3/2010 | Silverbrook et al. |
| 2010/0145955 A1 | 6/2010 | McDonald et al. |
| 2010/0281351 A1 | 11/2010 | Mohammed |
| 2010/0324993 A1* | 12/2010 | Kacholia .......... G06F 17/30864 705/14.54 |
| 2010/0328725 A1 | 12/2010 | Gaucas et al. |
| 2011/0040823 A1 | 2/2011 | Liu et al. |
| 2011/0078558 A1 | 3/2011 | Bao et al. |
| 2011/0213894 A1 | 9/2011 | Silberstein et al. |
| 2011/0235088 A1 | 9/2011 | Luo |
| 2012/0011021 A1 | 1/2012 | Wang et al. |
| 2012/0062935 A1 | 3/2012 | Kamath et al. |
| 2012/0203779 A1* | 8/2012 | Reisman ........... G06F 17/30648 707/732 |
| 2012/0212772 A1* | 8/2012 | Hwang ................ G06F 3/1206 358/1.15 |
| 2012/0262754 A1 | 10/2012 | Hwang |
| 2013/0010333 A1 | 1/2013 | Anand et al. |
| 2013/0097102 A1 | 4/2013 | Revesz |
| 2013/0103461 A1 | 4/2013 | Bhatia |
| 2013/0185364 A1 | 7/2013 | Bhatia |
| 2013/0222843 A1 | 8/2013 | Ganesan et al. |
| 2013/0250344 A1* | 9/2013 | Merriam ............... G06F 3/1208 358/1.15 |
| 2014/0036303 A1 | 2/2014 | Vishwanath et al. |
| 2014/0057278 A1 | 2/2014 | Okamoto et al. |
| 2014/0122486 A1 | 5/2014 | Simard et al. |
| 2014/0136541 A1 | 5/2014 | Farahat et al. |
| 2014/0214632 A1 | 7/2014 | Garera et al. |
| 2014/0324602 A1* | 10/2014 | Hummel ........... G06Q 30/0275 705/14.71 |
| 2015/0116205 A1* | 4/2015 | Westerman ............ G06F 3/016 345/156 |
| 2015/0169952 A1* | 6/2015 | O'Malley ......... G06F 17/30244 382/225 |
| 2015/0169991 A1* | 6/2015 | Zhang ................... G06K 9/74 382/182 |
| 2015/0234493 A1* | 8/2015 | Parivar ................. G06F 3/044 345/174 |
| 2017/0054859 A1* | 2/2017 | Zehler ............... H04N 1/00244 |
| 2018/0068083 A1* | 3/2018 | Cohen ................... G16H 50/30 |

FOREIGN PATENT DOCUMENTS

| | | |
|---|---|---|
| CN | 102253937 A | 11/2011 |
| EP | 0986213 | 5/2000 |
| WO | WO-2013048428 A1 | 4/2013 |
| WO | WO-2013159246 A1 | 10/2013 |

OTHER PUBLICATIONS

FORMATDYNAMICS, "Print or PDF with CleanPrint," Sep. 29 2014, found at https://chrome.google.com/~2 pages.

Kim, S-M. et al., "Improving Web Page Classification by Label-propagation Over Click Graphs," (Research Paper), Nov. 2009, CIKM '09~10 pages.

Luo, et al., "Web Article Extraction for Web Printing: a DOM+Visual based Approach," HP Labs, DocEng'09, 2009.~5 pages.

(56) References Cited

OTHER PUBLICATIONS

Merrill, S., Read Any RSS Feed on Your Lexmark All-in-one Printer, (Web Page) Jul. 6, 2010, http://techcrunch.com/~1 page.
Printable Web Pages on the Fly! (Web Page)~http://www.printer-friendly,com/~retrieved Oct. 2013~3 pages.
Quora, "What are good examples of machine learning enhanced with human intervention in e-commerce?" 2011~http://www.quora.com/~4 pages.
SPCURTIS81 "App Idea~Select Your Own RSS Feed for Scheduled Printing," HP Support Forums, Jul. 26, 2012, 2 pages.
Tsukada, M. et al., "Automatic Web-Page Classification by Using Machine Learning Methods," Web Intelligence: Research and Development, 2001, pp. 303-313.
Wikipedia, "Amazon Mechanical Turk," Sep. 27, 2014, <http://en.wikipedia.org/~7 pages.
Wikipedia, "Delicious (website)," Jun. 4, 2012, http://web.archive.org/~ 9 pages.
Wikipedia, "Google bookmarks," Mar. 7, 2012, <http://web.archive.org/~7 pages.
Wikipedia, "Machine learning," Oct. 24, 2014, <http://en.wikipedia.org/wiki/Machine_learning>, 12 pages.
Yu, B. et al., "Video Summarization Based on User Log Enhanced Link Analysis," (Research Paper), 11th ACM International Conference on Multimedia, 2003, 2 pages.

\* cited by examiner

PROVIDING A PRINT-READY DOCUMENT

BACKGROUND

Electronic documents, such as web pages, come in a variety of formats, e.g., documents may have different sizes, shapes, and layout properties. Electronic documents may also include a variety of content, such as text, images, videos, hyperlinks, and advertisements, to name a few. When electronic documents are printed, the quality of the prints may vary based on the format and content of the printed documents.

BRIEF DESCRIPTION OF THE DRAWINGS

The following detailed description references the drawings, wherein.

DETAILED DESCRIPTION

Figure 1A:
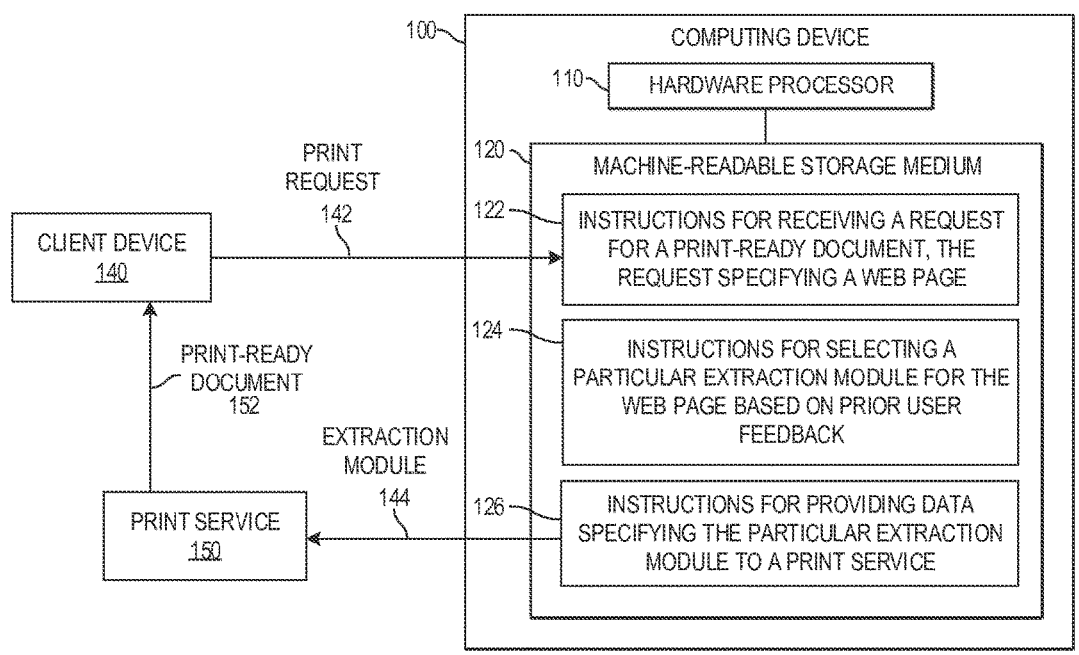
FIG. 1A is a block diagram of an example computing device for providing a print-ready document.

When printing electronic documents, the format of the documents may often need to be adjusted to fit on the target print medium, e.g., a web page may need to be scaled to fit on one or more sheets of 8.5"×11" paper with 0.5" margins. Depending on how the format and content of the electronic documents are handled by a printing service, the quality of the resulting printed documents may vary.

A print system facilitates the extraction of content from electronic documents and the formatting of the extracted content for printing. The print system may, for example, rank and select extraction modules to be used for extracting content from different types of documents, such as web pages. A print-ready document may be produced using the output of a particular extraction module.

By way of example, a user may elect to print a web page, such as an online news article. To create a print-ready document, e.g., a representation of an electronic document that is formatted for printing, content is extracted from the web page. The content that is extracted from the web page may depend on the extraction module used to perform the extraction, and some extraction modules may differ in the perceived quality of extracted content. For example, an extraction module that extracts content relevant to the user's interests, such as images, title text, and body text, may be more desirable for a user than an extraction module that extracts content that is not of interest to the user, such as advertisements and video still-images.

Methods used by computers to evaluate the quality of extracted content may differ from the methods used by users to evaluate the quality of extracted content, and may or may not correlate with users' perceived quality of a print-ready document produced using extracted content. In addition, a system relying entirely on user feedback may suffer from a lack of reliable and statistically significant feedback, while relying entirely on computer-based evaluations of quality may result in producing print-ready documents that users may perceive as low quality. As described in further detail below, some implementations of a print system may use a combination of computer evaluation and user feedback to select an extraction module to be used for preparing a print-ready document for a particular web page or type or web page.

For example, a print system may determine that a particular extraction module should be selected for a particular web page based on prior user feedback indicating that a print-ready document created using the particular extraction module on the particular web page was of high quality. In some implementations, user feedback may be collected after presentation of the print-ready document, and the feedback may be used to adjust a likelihood that the particular extraction will be selected for future print requests for the particular web page. In situations where user feedback for a particular extraction module and/or electronic document has not yet been received, the print system may select an extraction module based on computer evaluations and/or comparing electronic document characteristics to characteristics of other electronic documents printed using other extraction modules. Further examples and implementation details are provided in the paragraphs that follow.

Figure 1B:
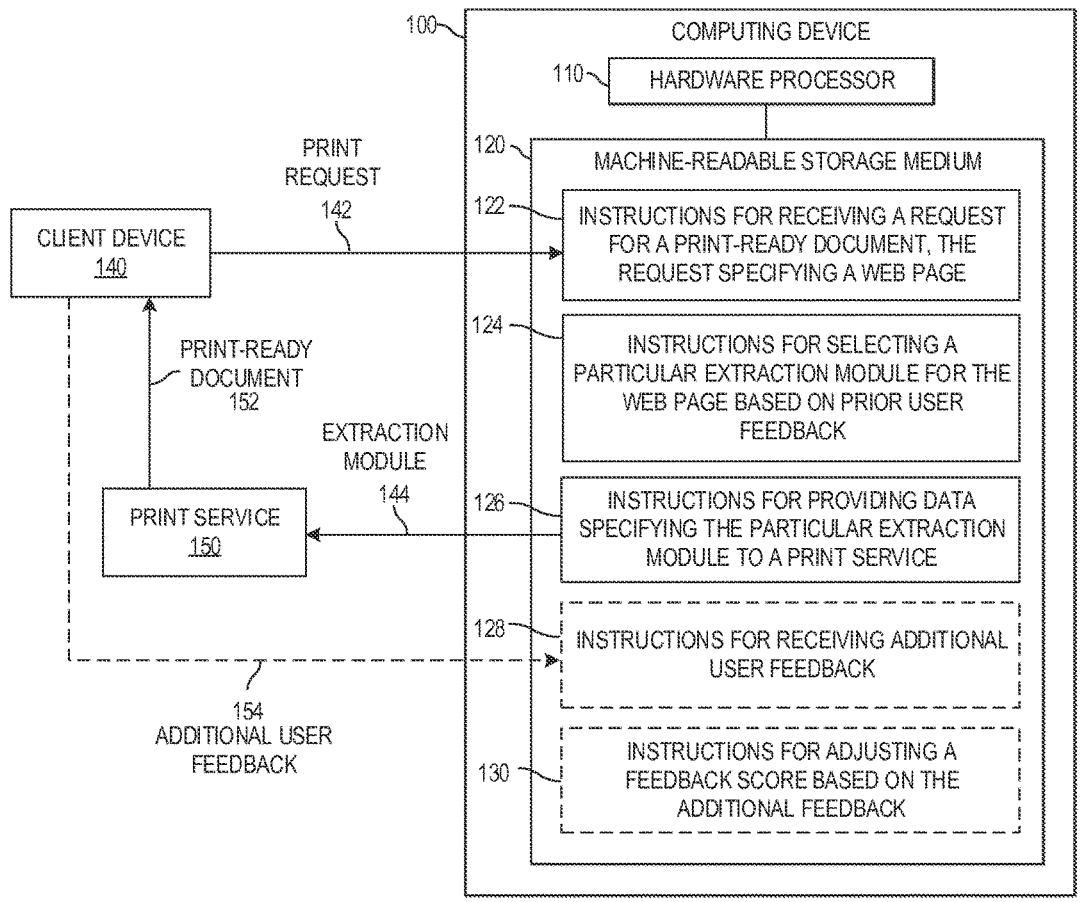
FIG. 1B is a block diagram of an example computing device for providing a print-ready document and adjusting a feedback score.

FIGS. 1A and 1B are block diagrams of an example computing device 100 for providing a print-ready document. In the example of FIGS. 1A and 1B, computing device 100 includes a hardware processor 110 and a machine-readable storage medium 120 comprising (e.g., encoded with) instructions, such as 122, 124, and 126, which are executable by hardware processor 110. In some implementations, storage medium 120 may include additional instructions, such as instructions 128 and 120 of FIG. 1B. Instructions 122, 124, 126, 128, 130, and any other instructions described herein in relation to storage medium 120, may be stored on a machine-readable storage medium remote from but accessible to computing device 100 and hardware processor 110 (e.g., via a computer network). In some implementations, instructions 122, 124, 126, 128, and 130 may be instructions of a computer program, computer application ("app"), agent, or the like, of computing device 100. The functionalities described herein in relation to instructions 122, 124, 126, 128, and 130 may, in some implementations, be implemented as engines comprising hardware or a combination of hardware and programming to implement the functionalities of the engines.

As used herein, a "computing device" may be a desktop computer, laptop (or notebook) computer, workstation, tablet computer, mobile phone, smart device, server, blade enclosure, or any other processing device or equipment. In examples described herein, a hardware processor may include, for example, one processor or multiple processors included in a single computing device (as shown in FIGS. 1A and 1B) or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution of instructions stored on a machine-readable storage medium, or a combination thereof. Hardware processor 110 may fetch, decode, and execute instructions stored on storage medium 120 to perform the functionalities described below. In some implementations, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

As shown in FIG. 1, the computing device 110 receives a request 142 for a print-ready document (122). The request 142 is received from a client device 140, such as a personal computer or other computing device. The request 142 specifies a web page for which the print-ready document is to be provided. For example, the client device 140 may send a print request 142 specifying the universal resource locator (URL) of a news web page for printing.

The computing device 100 selects a particular extraction module for the web page, and the selection is based on prior user feedback received from client devices (124). The prior user feedback indicates a measure of quality of print-ready documents created for the web page using content extracted from the web page by the particular extraction module. For example, other users may have reviewed print-ready documents that were created by the particular extraction module, and the reviews may indicate that the print-ready documents prepared using the particular extraction module are of high quality.

In some implementations, the particular extraction module is selected based on a match between a portion of the URL for web page to be printed and a second URL. The second URL may correspond to a second web page for which print-ready documents were created using the particular extraction module. By way of example, a print request 142 may be for the web page, "www.example.com/ printing." The URL may "match" a second URL for "www.example.com," and/or, in some implementations, for "www.example.com/printing." When using the term "match," the URL need not be an exact match, and similar URLs may be considered matches. For example, only the domain name and/or sub-domain may need to match. Extraction modules used to prepare a print-ready document for the second URL may have received prior user feedback, which may be used to select the extraction module to be used for the current print request 142 specifying "www.example.com/printing." As indicated above, the "match" between URLs need not be an exact match, and in some implementations, a regular expression or other matching method may be used to identify matches between URLs.

In some implementations, the particular extraction module is selected based on a feedback score for the particular extraction module meeting a threshold feedback score. The feedback score may be derived from the prior user feedback. For example, users may be asked to provide a quality rating for a print-ready document, such as a 1-10 rating, where 10 is the highest quality rating and 1 is the lowest quality rating. An example feedback score threshold of 5 may be used, where only extraction modules with a feedback score greater than or equal to 5, for the web page, is eligible for selection. Other methods may also be used for a feedback score, such as a binary aggregate of "good" and "bad" ratings, and the feedback score need not be numerical. In some implementations, a feedback score for an extraction module may be an average of scores provided by users.

In some implementations, prior user feedback for an extraction module may include implicit positive feedback and implicit negative feedback. An occurrence of implicit positive feedback may indicate that a user executed a print operation in response to being presented with a print-ready document prepared using a particular extraction module, while an occurrence of implicit negative feedback may indicate that a user device cancelled a print operation in response to being presented with the print-ready document prepared using the particular extraction module. For example, if 100 users were previously provided with a print-ready document for a web page that was prepared using a particular extraction module, and 80 of the users elected to print the document while 20 did not print the document, the occurrences of printing, or lack thereof, may be used as implicit feedback, e.g., resulting in an aggregate feedback score of 60 (80-20).

In some implementations feedback scores may be on a per web page basis, e.g., one extraction module may have a different feedback score for each web page. In some implementations, as described in further detail below, feedback scores may apply to categories of web pages, e.g., news pages, sports pages, social media pages, etc. Combinations of category and individual web page feedback scores may also be used.

The computing device 100 provides data specifying the particular extraction module 144 to a print service (150). The print service 150 causes presentation of a print-ready document 152 at the client device 140. The print-ready document 152 includes content extracted from the web page by the particular extraction module. When presented with the print-ready document 152, a user of the client device 140 may, for example, determine whether to print the document, e.g., on a local or network printer, or to cancel the printing process. The print-ready document 152 may include data that facilitates production of physical output by a printing device.

The print service 150 may be implemented in hardware or a combination of hardware and programming. The print service 150 may be implemented in the computing device 100, in a separate computing device, in the client device 140, or a combination thereof. For example, the print service 150 may be implemented in a server computer in communication with both the computing device 100 and client device. As another example, the print service 150 may be implemented in a web browsing application of the client device 140.

In some implementations, as shown in FIG. 1B, the computing device 100 receives additional user feedback 154 from the client device 140 (128). The additional user feedback 154 indicates a measure of quality of the print-ready document 152. For example, the additional user feedback 154 may include an explicit user rating, e.g., a score between 1 and 10, of the print-ready document 152 or implicit feedback, e.g., an indication of whether the print-ready document 152 was printed or if the print process was cancelled. The additional user feedback 154 may, in some implementations, become part of the prior user feedback, which may be used in future extraction module selection processes for the particular web page, or for pages similar to the web page.

In implementations where extraction modules have feedback scores, the computing device 100 may include instructions for adjust a feedback score based on the additional user feedback 154 (130). For example, if the additional user feedback 154 indicates that the client device 140 executed a print operation in response to receiving the print-ready document 152, the feedback score for the extraction module used to provide the print-ready document 152 may be updated to reflect that, e.g., a count of the number of times the web page has been printed using that extraction module may be incremented. Feedback scores may be adjusted in a number of ways, e.g., incrementally upon receipt of additional user feedback, or in batches of at least one additional feedback measurement, to name a few.

Figure 2:
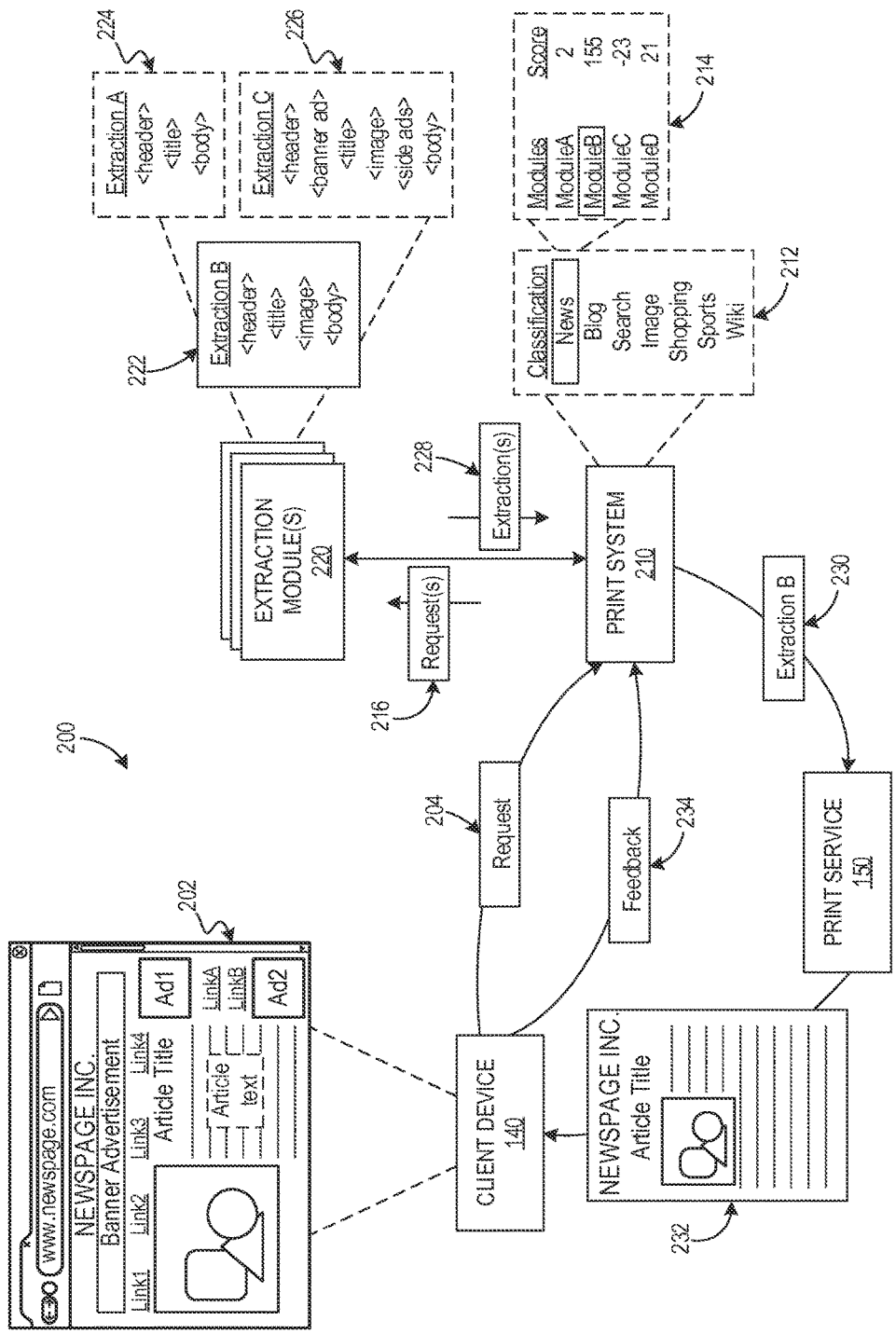
FIG. 2 is an example data flow for providing a print-ready document.

FIG. 2 is an example data flow 200 for providing a print-ready document 230. In the example data flow 200, an illustration of an example news web page 202 is being displayed on a client device 140. The example news web page 202 includes several types of content, such as a header, an article title, article text, an image, hyperlinks arranged horizontally and vertically, a banner advertisement, and side advertisements. Other example electronic documents may include similar and/or additional types of content that are not depicted in the news web page 100, such as videos, video stills, audio data, and interactive objects.

The client device 140 provides a request 204 to create a print-ready document for the news web page 202 to a print system 210. The print system 210 may be, for example, a computing device such as the computing devices described with respect to FIGS. 1A and 1B. Communication between the client device 140 and print system 210 may be across a network, such as the Internet, or by other means, depending on the desired implementation.

The print system 210 selects a classification for the web page 202 based on a characteristic of the web page 202. In some implementations, any number of characteristics may be used select a classification for a web page to be printed, and the print system 210 may select a classification based on a variety of characteristics. A web page classification, or category, may be used to identify and select extraction modules that have been used to extract content from the particular web page 202, or from pages similar to the web page 202, e.g., web pages with the same or similar classification.

In some implementations, as in the example data flow 200, the characteristic of the web page 202 used for classification is a web page category. The example classifications 212 include a variety of web page types, such as news pages, bog pages, search pages, image pages, shopping pages, sports pages, social network pages, recipe pages, and wiki pages. Other implementations may include more or less categories, and the categories may be more or less granular, as appropriate.

In the example data flow 200, the "news" category is selected for the web page 202. The category selected may depend on a variety of characteristics of the web page 202. For example, the client device 140 may provide an indication of the web page category, an administrator of the website hosting the web page 202 may include data in the web page 202 that identifies the category, the domain name of the web page's URL may be associated with a known category, or semantic analysis may be performed to determine the category—e.g., correlating the web page 202 layout with machine learned layout abstractions for various categories.

As noted above, in some implementations, the characteristic of a web page used for classification, or categorization, is a domain portion of the web page's URL. For example, if the URL of a web page to be printed is "www.newspage.com/breakingnews/example," the domain portion, "newspage.com," may be used to classify the web page. E.g., the domain portion may be matched to an existing domain stored in a database accessible by the print system 210. Matching the web page or other electronic document included in the request 204 to a particular classification may take place at multiple levels of granularity. For example, a general web page category may include a news category, which may include news web sites, which may include news web pages. A match may occur at any level of granularity, and the particular extraction modules available may be different for different types of matches, e.g., the extraction modules available for a particular news web page may be different from the extraction modules available for news web sites or news web pages in general.

The print system 210 requests extraction of content included in the web page 202 from a subset of the extraction modules associated with the classification. For example, while extraction modules Module A, B, C, and D are associated with the News classification, the print system 210 may only send a request(s) 216 for a subset of the associated extraction modules 214. In the data flow 200, for example, the print system 210 sends requests 216 to the extraction modules 220 that correspond to Module A, B, and C. In some implementations, as described above, extraction may be requested from at least one of the extraction modules based on prior user feedback received from a client devices.

In some implementations, the extraction modules associated with the most granular classification of the web page are prioritized over more granular classifications, e.g., extraction modules for the particular news web page may be prioritized for selection over extraction modules for the news web page category. In some implementations, one or more extraction modules from one or more levels of granularity may be selected for extraction. For example, in a situation where a first set of extraction modules are associated the news web page category that matches the particular news web page, and a second set of extraction modules are associated with a domain category that matches the particular news web page, one extraction module may be selected from each set.

In the example data flow 200, the news classification is associated with a set of extraction modules 214, e.g., in a database in communication with the print system 210. The actual extraction modules 220, which perform the extraction of content from web pages, may be implemented in hardware, software, or a combination thereof. While they are depicted separate from the print system 210, the extractions modules 220 may be implemented within the print system 210, in separate computing device(s), or any combination thereof.

In some implementations, the extraction modules 220 from which extraction is requested may be based on feedback scores for each extraction, e.g., where the feedback scores are obtained in a manner similar to that described above with reference to FIG. 1. For example, the print system 210 may request extraction for all extraction modules above a threshold feedback score; the n highest scoring extraction modules, where n is a positive integer; or for n extraction modules above a threshold feedback score. In some implementations, some extraction modules—such as new extraction modules or relatively low scoring extraction modules—may be intentionally selected, regardless of feedback scores, e.g., to ensure feedback score freshness. Other methods for selecting the particular extraction module(s) 220 to be used for extraction of content may also be used, such as a whitelist for extraction modules that are always selected for a particular web page category, or a black list for extraction modules that are never used for a particular web page category.

The example data flow 200 depicts three abstractions of extractions of content produced by extraction modules (220). Content included in extraction B 222 includes the header, title, image, and body of the news web page 202; content included in extraction A 224 includes the header, title, and body of the news web page 202; and content included in extraction C 226 includes the header, banner ad, title, image, side advertisements, and body of the news web page 202. The methods used by the extraction modules 220 for performing the actual extraction of content may vary. For example, extraction modules may use web page code, web page administrator instructions, and/or optical character recognition in extracting content from web pages.

The print system 210 receives, from each of the extraction modules 220, the extraction 228 of content for the web page. The print system 210 then selects a particular extraction from the extractions 228 received from the extraction modules 220. The selection is based on the content included in the particular extraction. For example, the print system 210 may evaluate extractions A, B, and C, assigning a score or rank for each of them. The score or rank may be based on the content included in the extractions, e.g., the number of characters extracted, inclusion of relevant types of content in the extraction, and the inclusion of irrelevant types of content in the extraction.

By way of example, the print system 210 may have weights associated with categories of content, the categories including: header text, title text, body text, caption text, image content, and advertising content. Header text, title text, body text, caption text, and image content may be associated with weights that increase an extraction score, while advertising content may be associated with a weight that decreases an extraction score. In this example, extractions that include header text, title text, body text, caption text, and image content may have extraction scores increased by inclusion of this content, while extractions that include advertising content may have extraction scores decreased by inclusion of this content. Other types of content may also be used, such as the inclusion of navigational content (e.g., links and menu bars), comment boxes, interactive elements, video objects, sound transcriptions or objects, to name a few. The weights for categories of content, and methods used to produce extraction scores, may vary. The granularity of content may also vary. For example, body text may include a cooking recipe, which can be a separate type of content which, when extracted, may be presented in a manner that is different from other types of body text, such as a news article.

In the example data flow 200, the print system 210 selects extraction B 222 from the extractions 228 provided by the extraction modules 220. The selection may be based, for example, on the inclusion of relevant content in extraction B 222 and the lack of relevant content—such as the image—and/or the inclusion of irrelevant content—such as the advertisements—in the other extractions.

The print system 210 provides data 230 specifying the particular extraction to a print service 150 that causes presentation of a print-ready document 232. For example, data 230 specifying extraction B is provided to the print service 150. The print service 150 may use the extracted content to produce a print-ready document 232 that includes the content included in the extraction. Extraction B included the header, title, image, and body text of the web page 202, and the print service 150 uses that content to create a print-ready document 232 that also includes the header, "NEWSPAGE INC.," the title, "Article Title," the image, and the body text.

The print service 150 causes the print-ready document 232 to be presented at the client device 140. The print-ready document 232 is designed be a representation of the web page 202 that includes content relevant to the user of the client device 140 and is in an appropriate format for printing, e.g., using various printers and on various print mediums. Whether the client device 140 executes a print operation or not, in some implementations, feedback 234—implicit and/or explicit—may be provided to the print system 210.

In implementations where the print system 210 receives feedback 234 from the client device 240, the feedback 234 may be used to adjust a feedback score for the extraction module used to create the print-ready document 230 which, in the example data flow 200, is extraction module B. The set of extraction modules 214 accessible by the print system 210 includes a feedback score for each of the extraction modules. The feedback score for extraction module B is 155. Using an example where the user feedback 234 is implicit feedback, e.g., either an indication of print or no print, the feedback score may be a count of the number of times the print-ready document 232 was printed minus the number of times the print-ready document 232 was not printed. In this example, a feedback score of 155 indicates that print-ready documents prepared using extraction module B were printed 155 times more than they were not printed. In situations where the feedback 234 indicates the client device 140 executed a print operation, the feedback score may be incremented to 156, while in situations where the feedback 234 indicates the client device 140 did not execute a print operation, the feedback score may be decremented to 154. Other types of user feedback may be provided, such as explicit user ratings, and many other methods may be used to determine and adjust feedback scores, such as calculating an average score from all the received feedback, from the most recent n occurrences of feedback, or from all feedback received within a particular period of time.

The feedback scores for extraction modules may be applied at one or more levels of granularity. For example, an extraction module may have a feedback score for a specific web page, a particular web site, a particular category of web pages and/or web sites, and/or for all types of web pages. In implementations where electronic documents other than web pages are printed, feedback scores may be based on the type of electronic document, e.g., for word processing documents, spreadsheets, presentation documents, etc.

While the example data flow 200 depicts the print system 210, extraction module(s) 220 and print service 150 separately, they may be implemented in any combination of one or more computing devices. For example, the extraction modules 220 and/or the print service 150 may be implemented in any combination of hardware and/or software within the same computing device(s) in which the print system 210 is implemented. In some implementations, the print service 210 is included in the client device 140, e.g., running in a web browsing application of the client device 140.

Figure 3:
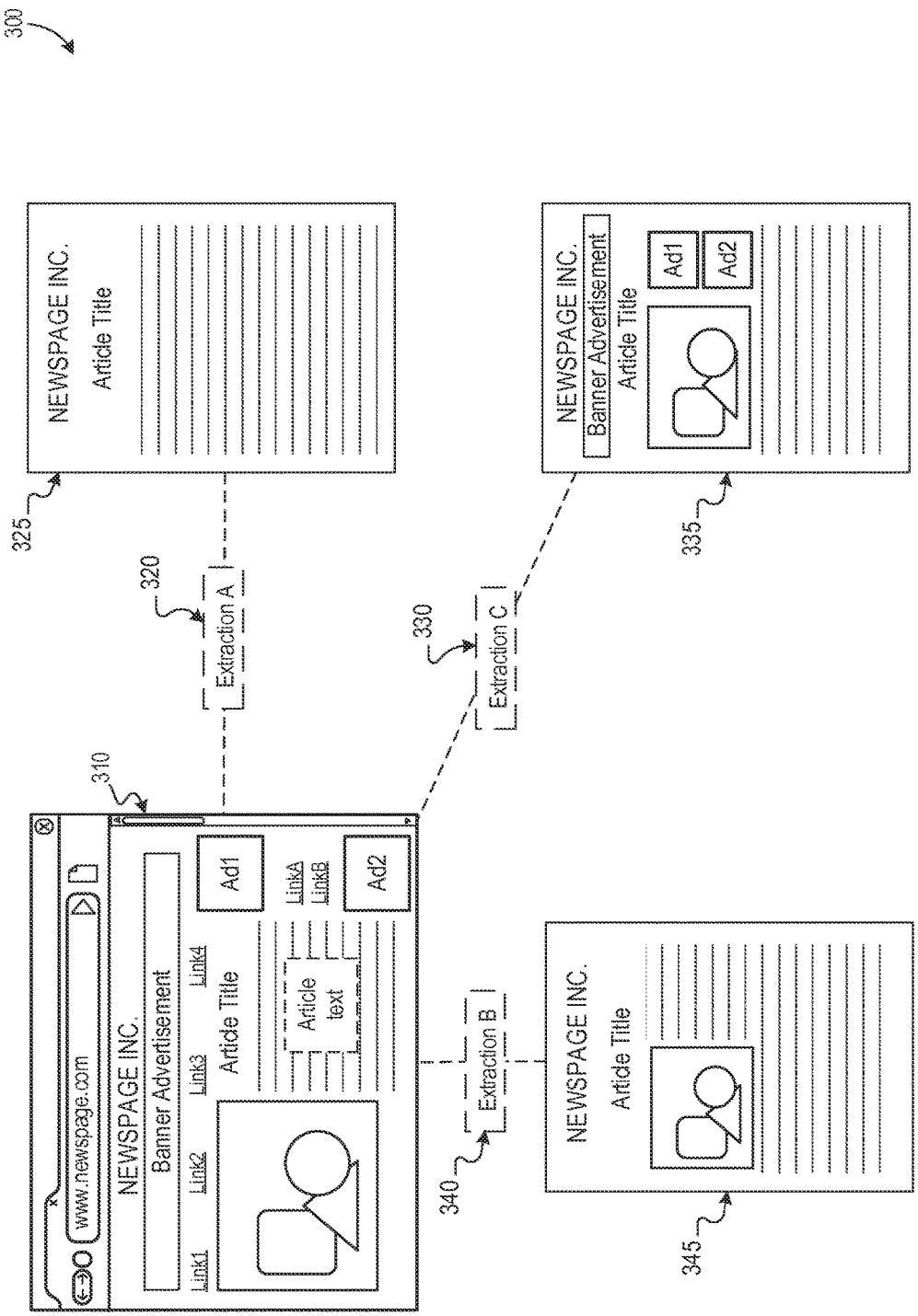
FIG. 3 is an illustration of example print-ready documents produced for a web page using various extraction modules.

FIG. 3 is an illustration of example print-ready documents 300 produced for a web page 310 using various extraction modules. The example web page 310 includes many different types of content. The content extracted using Extraction A 320 results in the print ready document 325 that includes the header, article title, and article text. The content extracted using Extraction B 330 results in the print ready document 335 that includes the header, banner advertisement, article title, image, side advertisements, and article text. The content extracted using Extraction B 340 results in the print ready document 345 that includes the header, article title, image, and article text. Each print-ready document is an example of a print-ready document that may be presented to a client device for printing. In implementations where user feedback is incorporated in selecting extraction modules, the likelihood of selecting an extraction module that produces a print-ready document having the content relevant to users may increase.

Figure 4:
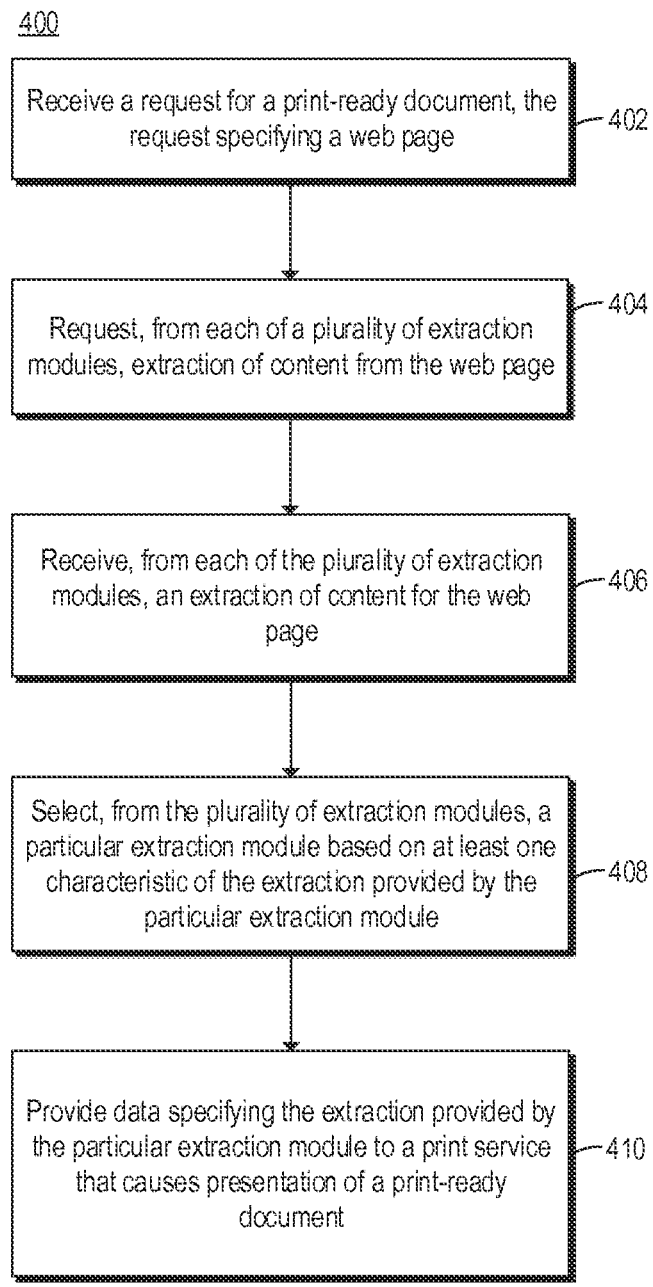
FIG. 4 is a flow diagram of an example method for providing a print-ready document.

FIG. 4 is a flow diagram of an example method 400 for providing a print-ready document. Although execution of method 400 may be implemented in a computing device, such as the computing device 100 of FIGS. 1A and 1B, and/or the print system 210 of FIG. 2, other suitable devices for execution of method 400 may be used. Method 400 may be implemented in the form of executable instructions stored on a machine-readable storage medium, such as storage medium 120, and/or in the form of electronic circuitry.

A request for a print-ready document is received (402). The request specifies a web page for which the print-ready document is to be provided. For example, a user of a client device may cause the client device to send a print request, which specifies a shopping web page, to a print system.

In some implementations, at least one classification is identified for the web page, each classification being associated with a type of content presented at web pages with that classification. For example, a shopping web page classification may be associated with content such as images, one or more currency symbols, and particular textual strings, such as "add to shopping cart," "customer reviews," "in stock," etc.

Extraction of content from the web page is requested from each of a plurality of extraction modules (404). In some implementations, extraction is requested from at least one of the plurality of extraction modules based on prior user feedback received from a plurality of client devices. In implementations where one or more classifications are identified for the web page, each classification may be associated with one or more extraction modules, and the extraction modules for which extraction is requested are selected from the those extraction modules. In some implementations, a print system selects which extraction modules to request extraction from based on a characteristic of the web page and/or feedback scores for extraction modules that are based on prior user feedback. For example, the domain of the shopping web page may be associated with a whitelist of extraction modules that are to be used to extract content from web pages associated with the domain. The extraction modules may be included in the white list, for example, based on prior user feedback indicating that the extraction modules extracted content used to produce high quality print-ready documents.

An extraction of content for the web page is received from each of the plurality of extraction modules (406). Each extraction includes content obtained from the web page, and the content of each extraction is different from the content of each other extraction. For example, each extraction module may produce data representing the shopping web page header, title, image(s), description, reviews, price, and other objects, such as control buttons, web links, video object still images, etc.

From the plurality of extraction modules, a particular extraction module is selected based on at least one characteristic of the extraction provided by the particular extraction module (408). In some implementations, the characteristics of each extraction include at least one of: an amount of text extracted from the web page; a measure of quality associated with each type of text extracted from the web page; a number of advertisements extracted from the web page; a number of non-textual content items extracted from the web page; and a measure of quality associated with each type of non-textual content item extracted from the web page. For example, different weights may each be associated with a different type of text, such as title text, caption text, header text, and body text. Non-textual content, such as links, images, video stills, advertisements, and other objects, may also each be associated with a weight indicating their relative quality, e.g., as determined by an administrator, machine, machine learning with user feedback, or other method or combination of methods.

Data specifying the extraction provided by the particular extraction module is provided to a print service that causes presentation of a print-ready document at the client device (410). The print-ready document includes the content obtained from the web page by the particular extraction module. In the shopping web page example, the selected extraction module may extract content that includes a name, price, picture, and reviews of a product, as well as a header text, description text, and other objects. The extracted content may be provided to a print service running on a server computer, and the print service may format the extracted content into a print-ready document before providing it to the client device for presentation to the user of the client device.

In some implementations, user feedback is received from the client device, the user feedback indicating a measure of quality of the print-ready document. For example, user feedback may include a quality rating from 1 to 10, where 10 is a highest quality measure and 1 is the lowest quality measure. A feedback score for the particular extraction module may be adjusted based on the user feedback. For example, the quality rating may be used to calculate an average quality rating for the ratings received from other users who provided feedback for a print-ready document that was created using the particular extraction module.

In some implementations, in response to the feedback score for the particular extraction module meeting a threshold feedback score, the particular extraction module is identified as a whitelist extraction module for the web page, the whitelist extraction module being selected as a default extraction module for subsequent requests for print-ready documents specifying the web page. In some implementations, more than one extraction module may be white listed. In situations where multiple extraction modules are white listed for a particular web page extraction may be requested from one, e.g., the highest scoring, or both extraction modules for subsequent print requests specifying the particular web page. In implementations where a different level of granularity, such as web page classifications, or multiple levels of granularity are used, a white list may be created separately for each level of granularity.

The foregoing disclosure describes a number of example implementations for providing print-ready documents. As detailed above, example implementations provide print-ready documents based on electronic document features, such as machine generated measures of quality and user feedback. As indicated above, many implementations may be used and result in additional or different advantages.

We claim:

1. A non-transitory machine-readable storage medium encoded with instructions executable by a processor of a computing device for providing a print-ready document, the machine-readable storage medium comprising:

instructions to receive, from a client device, a request for a print-ready document, the request specifying a web page for which the print-ready document is to be provided;
instructions to select a particular extraction module to extract content from electronic documents from a plurality of extraction modules for the web page based on a feedback score for the particular extraction module meeting a threshold feedback score that is derived from prior user feedback received from a plurality of client devices, the prior user feedback indicating a measure of quality of print-ready documents created for the web page using content extracted from the web page by the particular extraction module; and
instructions to provide data specifying the particular extraction module to a print service that causes presentation of the print-ready document at the client device, the print-ready document including content extracted from the web page by the particular extraction module.

2. The storage medium of claim 1, wherein the machine-readable storage medium further comprises:
instructions for receiving, from the client device, additional user feedback indicating a measure of quality of the print-ready document; and
adjusting the feedback score based on the additional user feedback.

3. The storage medium of claim 1, wherein the prior user feedback comprises implicit positive feedback and implicit negative feedback, each occurrence of implicit positive feedback indicating one of the plurality of client devices executing a print operation in response to being presented with the print-ready document, and each occurrence of implicit negative feedback indicating one of the plurality of client devices cancelling a print operation in response to being presented with the print-ready document.

4. The storage medium of claim 1, wherein selecting the particular extraction module from the plurality of extraction modules for the web page comprises selecting the particular extraction module based on a match between at least a portion of a first universal resource locator for the web page to a second universal resource locator, the second universal resource locator corresponding to a second web page for which print-ready documents were created using the particular extraction module.

5. A computing device for providing a print-ready document, the computing device comprising:
a hardware processor; and
a computer readable medium storing instructions that, when executed by the hardware processor, cause the hardware processor to:
receive a request for a print-ready document, the request specifying a web page for which the print-ready document is to be provided;
select a classification for the web page based a characteristic of the web page;
request extraction of content included in the web page from a plurality of extraction modules to extract content from electronic documents associated with the classification, where extraction is requested from at least one of the plurality of extraction modules based on feedback scores for the plurality of extraction modules meeting threshold feedback scores derived from prior user feedback received from a plurality of client devices;
receive, from each of the plurality of extraction modules, an extraction of content for the web page, each extraction including content obtained from the web page;
select a particular extraction from the extractions received from each of the plurality of extraction modules, the selection being based on the content included in the particular extraction; and
provide data specifying the particular extraction to a print service that causes presentation of a print-ready document.

6. The computing device of claim 5, wherein each extraction has an extraction score that is based on the content included in the extraction, and wherein the selection of the particular extraction is based on the extraction score of the particular extraction being higher than each other extraction score of other extractions provided by the plurality of extraction modules.

7. The computing device of claim 5, wherein the characteristic of the web page is a domain portion of a universal resource locator of the web page.

8. The computing device of claim 5, wherein each of the plurality of extraction modules corresponds to a web page category, and wherein each web page category comprises one of:
a news page category;
a blog page category;
a search page category;
an image page category; or
a shopping page category.

9. The computing device of claim 5, wherein content obtained from the web page includes content from each of a plurality of categories of content, the categories of content comprising:
header text;
title text;
body text;
caption text;
image content; and
advertising content.

10. The computing device of claim 9, wherein each category of content is associated with a category weight, and wherein the extraction score for each extraction is based on category weights of each category of content included in the extraction.

11. A method for providing a print-ready document, the method comprising:
receiving, from a client device, a request for a print-ready document, the request specifying a web page for which the print-ready document is to be provided;
requesting, from each of a plurality of extraction modules to extract content from electronic documents, extraction of content from the web page, where extraction is requested from at least one of the plurality of extraction modules based on feedback scores for the plurality of extraction modules meeting threshold feedback scores derived from prior user feedback received from a plurality of client devices;
receiving, from each of the plurality extraction modules, an extraction of content for the web page, each extraction comprising content obtained from the web page, wherein the content of each extraction is different from the content of each other extraction;
selecting, from the plurality of extraction modules, a particular extraction module based on at least one characteristic of the extraction provided by the particular extraction module; and providing data specifying the extraction provided by the particular extraction module to a print service that causes presentation of a print-ready document at the client device, the print-ready document including the content obtained from the web page by the particular extraction module.

12. The method of claim 11, wherein the at least one characteristics of each extraction include at least one of:
   an amount of text extracted from the web page;
   a measure of quality associated with each type of text extracted from the web page;
   a number of advertisements extracted from the web page;
   a number of non-textual content items extracted from the web page; and
   a measure of quality associated with each type of non-textual content item extracted from the web page.

13. The method of claim 11, further comprising:
   receiving, from the client device, user feedback indicating a measure of quality of the print-ready document;
   adjusting a feedback score for the particular extraction module based on the user feedback; and
   in response to the feedback score for the particular extraction module meeting a threshold feedback score:
      identifying the extraction module as a whitelist extraction module for the web page, the whitelist extraction module being selected as a default extraction module for subsequent requests for print-ready documents specifying the web page.

14. The method of claim 11, further comprising:
   identifying at least one classification for the web page, each classification being associated with a type of content presented at web pages having the classification;
   wherein each classification is associated with a plurality of class extraction modules, and wherein the plurality of extraction modules for which extraction is requested are selected from the plurality of class extraction modules associated with each of the at least one of identified classifications for the web page.

* * * * *